United States Patent
Sato et al.

(10) Patent No.: US 7,409,098 B2
(45) Date of Patent: Aug. 5, 2008

(54) IMAGE PROCESSING APPARATUS AND METHOD FOR CODING WITH COMPLEXITY-BASED QUANTIZATION

(75) Inventors: Kazushi Sato, Chiba (JP); Osamu Sunohara, Tokyo (JP); Kuniaki Takahashi, Kanagawa (JP); Teruhiko Suzuki, Chiba (JP); Yoichi Yagasaki, Tokyo (JP)

(73) Assignee: Sony Corporation, Tokyo (JP)

(*) Notice: Subject to any disclaimer, the term of this patent is extended or adjusted under 35 U.S.C. 154(b) by 851 days.

(21) Appl. No.: 10/733,255

(22) Filed: Dec. 12, 2003

(65) Prior Publication Data

US 2004/0228536 A1 Nov. 18, 2004

(30) Foreign Application Priority Data

Dec. 12, 2002 (JP) ............................. 2002-360885

(51) Int. Cl.
*G06K 9/00* (2006.01)
*G06K 9/36* (2006.01)
*G06K 9/38* (2006.01)
*G06K 9/46* (2006.01)
*H04B 1/66* (2006.01)
*H04N 1/00* (2006.01)
*H04N 7/12* (2006.01)
*H04N 11/02* (2006.01)
*H04N 11/04* (2006.01)

(52) U.S. Cl. .................. 382/239; 382/166; 382/251; 348/404.1; 358/426.04; 375/240.03

(58) Field of Classification Search .............. 382/166, 382/239, 251; 348/404.1; 358/426.04; 375/240.03
See application file for complete search history.

(56) References Cited

U.S. PATENT DOCUMENTS

| | | | | |
|---|---|---|---|---|
| 5,374,958 A | * | 12/1994 | Yanagihara | 375/240.04 |
| 5,489,944 A | * | 2/1996 | Jo | 375/240.03 |
| 5,515,105 A | * | 5/1996 | Lim | 375/240.04 |
| 5,592,226 A | * | 1/1997 | Lee et al. | 375/240.14 |
| 5,699,119 A | * | 12/1997 | Chung et al. | 375/240.04 |
| 5,990,957 A | * | 11/1999 | Ryoo | 375/240.03 |
| 6,044,115 A | * | 3/2000 | Horiike et al. | 375/240.05 |
| 6,078,615 A | * | 6/2000 | Yamamoto et al. | 375/240 |
| 6,137,835 A | * | 10/2000 | Yamashita et al. | 375/240 |
| 6,463,100 B1 | * | 10/2002 | Cho et al. | 375/240.03 |
| 6,763,138 B1 | * | 7/2004 | Yokoyama | 382/236 |
| 6,831,947 B2 | * | 12/2004 | Ribas Corbera | 375/240.03 |
| 2004/0037356 A1 | * | 2/2004 | Chang et al. | 375/240.03 |
| 2004/0042548 A1 | * | 3/2004 | Yu et al. | 375/240.03 |
| 2004/0114686 A1 | * | 6/2004 | Sugiyama et al. | 375/240.03 |
| 2006/0088099 A1 | * | 4/2006 | Gao et al. | 375/240.16 |

* cited by examiner

*Primary Examiner*—Yubin Hung
(74) *Attorney, Agent, or Firm*—Oblon, Spivak, McClelland, Maier & Neustadt, P.C.

(57) ABSTRACT

An image processing apparatus is provided that can define the change amount of a quantizing parameter by suitably reflecting the complexity of image data in the case, when the quantizing parameter is increased a predetermined unit amount, the coarseness the image data of motion picture is quantized becomes r times. An activity computing circuit generates an activity $Nact_j$ serving as a complexity of the image data. A $\Delta Q$ computing circuit defines a corresponding relationship between activity $Nact_j$ and change amount data $\Delta Q$ such that the change amount data $\Delta Q$ of quantizing parameter increases 1 as the activity $Nact_j$ becomes 1.12 times, to thereby acquire change amount data $\Delta Q$ corresponding to the activity $Nact_j$ generated by the activity computing circuit.

17 Claims, 12 Drawing Sheets

FIG. 6

| QPy | <30 | 30 | 31 | 32 | 33 | 34 | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|---|---|---|---|---|---|
| QPc | =QPy | 29 | 30 | 31 | 32 | 32 | 33 | 34 | 34 | 35 | 35 | 36 | 36 | 37 | 37 | 37 | 38 | 38 | 38 | 39 | 39 | 39 | 39 |

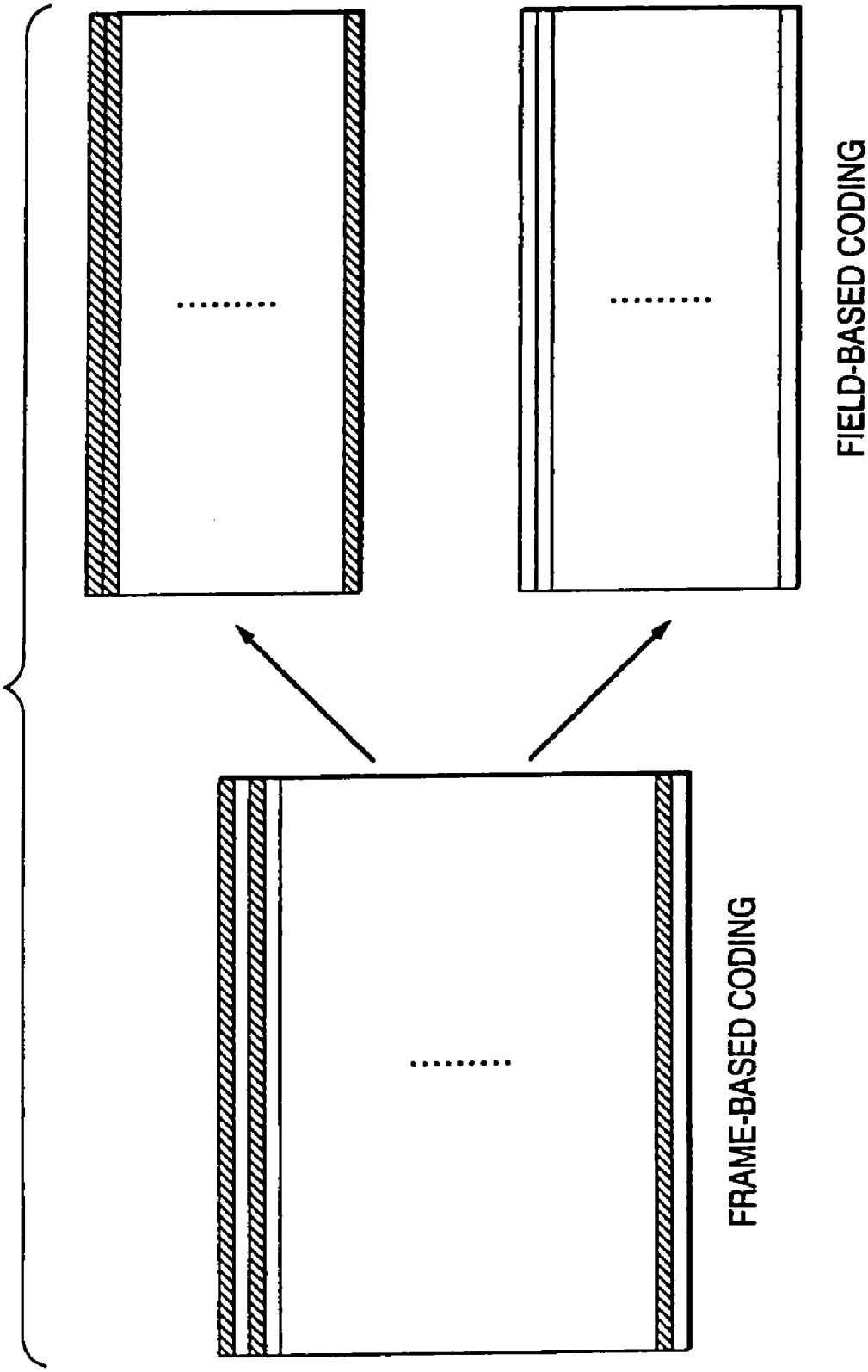

A PAIR OF MBS IN FRAME → TOP/BOTTOM MBS IN FIELD

MB PAIR

| INPUT: Nact | | OUTPUT: ΔQP |
|---|---|---|
| MINIMUM VALUE | MAXIMUM VALUE | |
| 0.5 | 0.536168 | -6 |
| 0.536168 | 0.600508 | -5 |
| 0.600508 | 0.672569 | -4 |
| 0.672569 | 0.753277 | -3 |
| 0.753277 | 0.843671 | -2 |
| 0.843671 | 0.944911 | -1 |
| 0.944911 | 1.058301 | 0 |
| 1.058301 | 1.185297 | +1 |
| 1.185297 | 1.327532 | +2 |
| 1.327532 | 1.486836 | +3 |
| 1.486836 | 1.665256 | +4 |
| 1.665256 | 1.865087 | +5 |
| 1.856087 | 2.0 | +6 |

IMAGE PROCESSING APPARATUS AND METHOD FOR CODING WITH COMPLEXITY-BASED QUANTIZATION

BACKGROUND OF THE INVENTION

1. Field of the Invention

This invention relates to an apparatus and method for image processing and apparatus for coding that can define a quantizing parameter in a suitable way.

2. Discussion of the Background

Recently, apparatuses conforming to the MPEG (Moving Picture Experts Group) scheme to handle image data are becoming more widespread. In such apparatuses compression is made by orthogonal transform such as discrete cosine transform and motion compensation through utilizing redundancy unique to image information for the purpose of efficient transmission and storage of information, both in distributing information at the broadcast station and in receiving information at the general household.

Particularly, MPEG2 (ISO/IEC13818-2) is defined as a general-purpose image coding scheme. This is the standard covering both images of interlaced scanning and progressive scanning as well as both images of standard resolution and high definition, now being broadly used over a wide range of applications for professional and consumer uses.

The use of the MPEG2 compression scheme can realize high compression efficiency and favorable image quality by assigning a code amount (bit rate), for example, of 4-8 Mbps for a standard-resolution interlaced scanning image having 720×480 pixels or of 18-22 Mbps for a high-resolution interlaced scanning image having 1920×1080 pixels.

MPEG2 is mainly for high image-quality coding adapted for broadcast, not suited for the lower code amount (bit rate) than MPEG1, namely the higher compressive coding scheme. The need for such a coding scheme is expected to expand in the future, due to the spread of personal digital assistants. In order to cope with this, standardization has been completed on the MPEG4 coding scheme. Concerning the image coding scheme, the standard has been approved as an international standard ISO/IEC14496-2, December 1998.

Furthermore, another standardization, called standard H.26L (ITU-T Q6/16 VCEG), has recently been pushed forward aiming at image coding initially for TV conferences. H.26L is known to realize higher coding efficiency despite requiring a much greater operation amount in coding and decoding as compared to the traditional coding schemes such as MPEG2 and MPEG4. Meanwhile, Joint Model of Enhanced-Compression Video Coding is now under standardization as part of MPEG4 activity, to introduce functions not supported under the H.26L standard on the basis of the H.26L standards, and to thereby realize higher coding efficiency.

The coding apparatuses under the MPEG and H.26L standards realize efficient coding by making most of the local pieces of information of an image.

An image has a nature that a complicated part of the image, even if coded coarser in quantization than other parts, can be less visually recognized of image deterioration.

For this reason, in the foregoing coding apparatus, the image is divided into a plurality of parts to detect a complexity of the image on each part. Based on the detection result, complicated parts of the image are quantized coarsely, while the other parts are quantized finely, thereby reducing a data amount while suppressing the effect of image deterioration.

The information about image complexity is called activity.

In the foregoing coding apparatus, activity is computed on the image data as a subject of quantization, to generate a quantizing parameter to regulate a quantizing scale on the basis of the activity.

In the meanwhile, the foregoing H.26L standard defines (Periodic Quantization) to quantize the image data of motion picture by increasing coarseness 1.12 times (12% increase) with increasing 1 in a quantizing parameter.

Accordingly, taking account of this, the present inventors recognized there is a necessity to generate the quantizing parameter on the basis of the activity.

SUMMARY OF THE INVENTION

It is an object of the present invention to provide a novel apparatus and method for image processing and apparatus for coding that can define a change amount of a quantizing parameter by suitably reflecting the complexity of image data in the case, when the quantizing parameter is increased a predetermined unit amount, the coarseness that the image data of motion picture is quantized becomes r times.

In order to achieve the foregoing object, an image processing apparatus of a first invention is an image processing apparatus for generating, when image data of a motion picture is made r times in quantization coarseness upon increasing a quantizing parameter a predetermined unit amount, change amount data representative of the change amount of the quantizing parameter, the image processing apparatus comprising: index data generating means for generating index data serving as an index of complexity of the image data; and change amount data acquiring means for defining a corresponding relationship between the index data and the change amount data such that, when the index data becomes r times, the change amount data is increased the unit amount, and acquiring the change amount data corresponding to the index data generated by the index data generating means.

The image processing apparatus of the first invention operates as follows.

The index data generating means generates index data serving as an index of complexity of the image data.

Then, the change amount data acquiring means defines a corresponding relationship between the index data and the change amount data such that, when the index data becomes r times, the change amount data is increased the unit amount, and acquires the change amount data corresponding to the index data generated by the index data generating means.

An image processing method of a second invention is an image processing method for generating, when image data of a motion picture is made r times in quantization coarseness upon increasing a quantizing parameter a predetermined unit amount, change amount data representative of the change amount of the quantizing parameter, the image processing method comprising: a first process of generating index data serving as an index of complexity of the image data; and a second process of defining a corresponding relationship between the index data and the change amount data such that, when the index data becomes r times, the change amount data is increased the unit amount, and of acquiring the change amount data corresponding to the index data generated on the basis of the definition in the first process.

A coding apparatus of a third invention comprises: index data generating means for generating index data serving as an index of complexity of image data; change amount data acquiring means for defining a corresponding relationship between the index data and the change amount data such that, when the index data becomes r times, the change amount data is increased the unit amount, and for acquiring the change amount data corresponding to the index data generated on the basis of the definition by the index data generating means; quantizing parameter generating means for generating the quantizing parameter on the basis of reference data defined on the basis of a code amount assigned to the image data as a subject of coding and of the change amount data acquired by the change amount data acquiring means; an orthogonal transform circuit for orthogonally transforming image data; a quantizing circuit for quantizing image data orthogonally transformed by the orthogonal transform circuit; a quantizing control circuit for controlling quantization by the quantizing circuit such that quantization coarseness is made r times as the quantizing parameter is increased a predetermined unit amount, on the basis of the quantizing parameter generated by the quantizing parameter generating means; a motion predicting/compensating circuit for generating reference image data and a motion vector, on the basis of image data quantized by the quantizing circuit; and a coding circuit for coding image data quantized by the quantizing circuit.

The coding apparatus of the third invention operates as follows.

The index data generating means generates index data to serve as an index of complexity of the image data.

Then, the change amount data acquiring means defines a corresponding relationship between the index data and the change amount data such that, when the index data becomes r times, the change amount data is increased the unit amount, and acquires the change amount data corresponding to the index data generated on the basis of the definition by the index data generating means.

Also, the orthogonal transform circuit orthogonally transforms image data.

Then, the quantizing circuit quantizes the image data orthogonally transformed by the orthogonal transform circuit.

At this time, the quantizing control circuit controls quantization by the quantizing circuit such that quantization coarseness is made r times as the quantizing parameter is increased a predetermined unit amount, on the basis of the quantizing parameter generated by the quantizing parameter generating means.

Then, a motion predicting/compensating circuit generates reference image data and a motion vector, on the basis of image data quantized by the quantizing circuit.

Also, a coding circuit makes a coding on image data quantized by the quantizing circuit.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 6 is a figure showing the corresponding relationship between a quantizing parameter $QP_y$ on the luminance signal and a quantizing parameter $QP_c$ on the chrominance signal, defined under the JVT coding scheme;

FIG. 7 is a figure for explaining a field/frame adaptive coding scheme in picture level, defined under the JVT coding scheme;

FIG. 11 is a figure showing the corresponding relationship between an input value $Nact_j$ and an output value $\Delta QP$, in a $\Delta Q$ computing circuit.

DETAILED DESCRIPTION OF THE INVENTION

Figure 1:
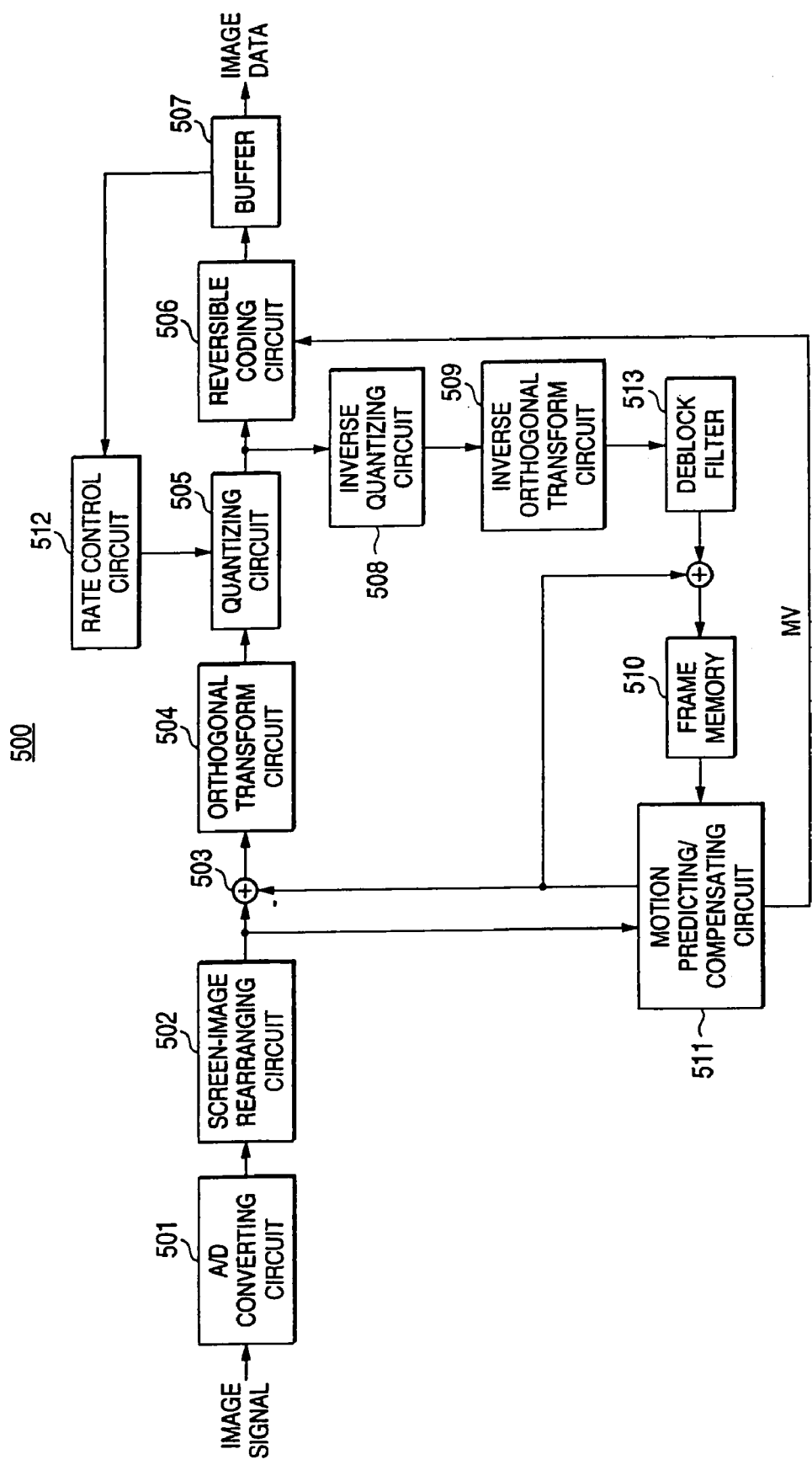
FIG. 1 is a functional block diagram of a coding apparatus according to a background art to the present invention.

FIG. 1 is a functional block diagram of a coding apparatus 500 of a background art to the present invention.

In the coding apparatus 500 shown in FIG. 1, the input image signal is first converted into a digital signal in an A/D converting circuit 501. Then, depending upon a GOP (Group of Pictures) structure of output image compression information, the frame image data is rearranged in a screen-image rearranging circuit 502.

The image, to be subjected to intra-coding, in its entire of frame image data is input to an orthogonal transform circuit 504. In the orthogonal transform circuit 504, an orthogonal transform, such as a discrete cosine transform or a Karhunen-Loeve transform, is carried out.

The orthogonal transform circuit 504 outputs a transform coefficient to be quantization-processed in a quantizing circuit 505.

The quantizing circuit 505 outputs a quantized transform coefficient to be input to a reversible coding circuit 506 where it is subjected to reversible coding such as variable-length coding or arithmetic coding. Then, it is stored to a buffer 507, and then output as compressed image data.

The quantizing circuit 505 has a quantization rate controlled by the rate control circuit 512. At the same time, the quantized transform coefficient output from the quantizing circuit 505 is inversely quantized in the inverse quantizing circuit 508, and subsequently subjected to an inverse orthogonal transform process in an inverse orthogonal transform circuit 509, to obtain reference frame image data removed of block distortion and decoded by the deblock filter 513. The reference frame image data is stored in a frame memory 510.

Meanwhile, concerning the image to be subjected to inter-coding, the frame image data output from the screen-image rearranging circuit 502 is input to a motion predicting/compensating circuit 511. At the same time, reference frame image data is read from the frame memory 510, to generate a motion vector MV by the motion predicting/compensating circuit 511. Using the motion vector and the reference frame image data, predictive frame image data is generated. The predictive frame image data is output to an operating circuit 503. The operating circuit 503 generates image data representative of a difference between the frame image data from the screen-image rearranging circuit 502 and the predictive frame image data from the motion predicting/compensating circuit 511. The image data is output to the orthogonal transform circuit 504.

Meanwhile, the motion predicting/compensating circuit 511 outputs the motion vector MV to the reversible coding circuit 506. In the reversible coding circuit 506, the motion vector is subjected to a reversible coding process, such as variable-length coding or arithmetic coding, and is inserted to a header of the image signal. The other processes are similar to the processes of the image signal to be subjected to intra-coding.

Figure 2:
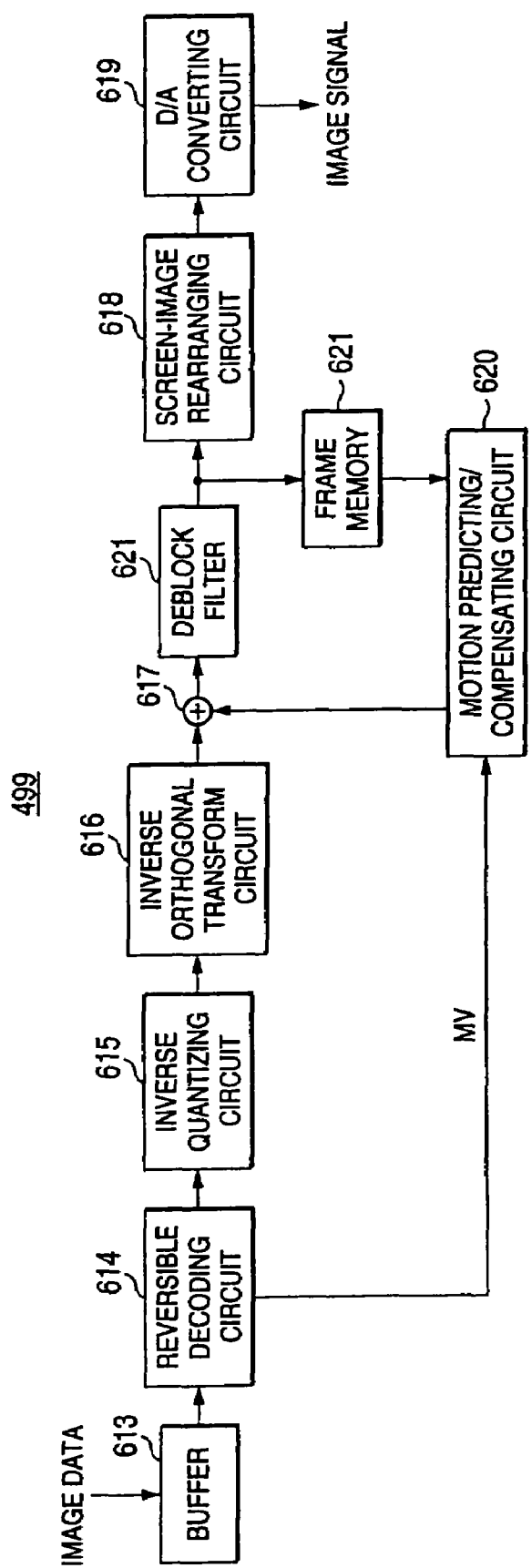
FIG. 2 is a functional block diagram of a decoding apparatus according to a background art to the present invention.

FIG. 2 is a functional block diagram of a decoding circuit 499 corresponding to the coding apparatus 500 shown in FIG. 1.

In the decoding circuit 499 shown in FIG. 2, input image data is stored in a buffer 613 and then output to a reversible decoding circuit 614. In the reversible decoding circuit 614, the image data is subjected to a process, such as variable-length decoding or arithmetic decoding, on the basis of a format of the frame image data. Simultaneously, in the case that the relevant frame image data is an inter-coded one, the motion vector MV stored in the header of the frame image data is also decoded in the reversible decoding circuit 614. The motion vector MV is output to a motion predicting/compensating circuit 620.

The reversible decoding circuit 614 outputs a quantized transform coefficient to be input to an inverse quantizing circuit 615 where it is inverse quantized. The inverse quantized transform coefficient is subjected, in the inverse orthogonal transform circuit 616, to an inverse orthogonal transform, such as an inverse discrete cosine transform or an inverse Karhunen-Loeve transform, on the basis of a predetermined frame image data format. In the case that the relevant frame image data is an intra-coded one, the frame image data subjected to inverse orthogonal transform process is removed of block distortion by a deblock filter 621 and then stored to a screen-image rearranging buffer 618, and is then output through D/A conversion process by a D/A converting circuit 619.

Meanwhile, in the case that the relevant frame is an inter-coded one, the motion predicting/compensating circuit 620 generates predictive frame image data on the basis of the motion vector MV and the reference frame data stored in the frame memory 621. The predictive frame image data, in the adder 617, is added by the frame image data output from the inverse orthogonal transform circuit 616. The subsequent processes are similar to the processes of the intra-coded frame image data.

Now, the inverse orthogonal transform process and inverse quantizing process defined under the H.26L standard are described.

Figure 3:
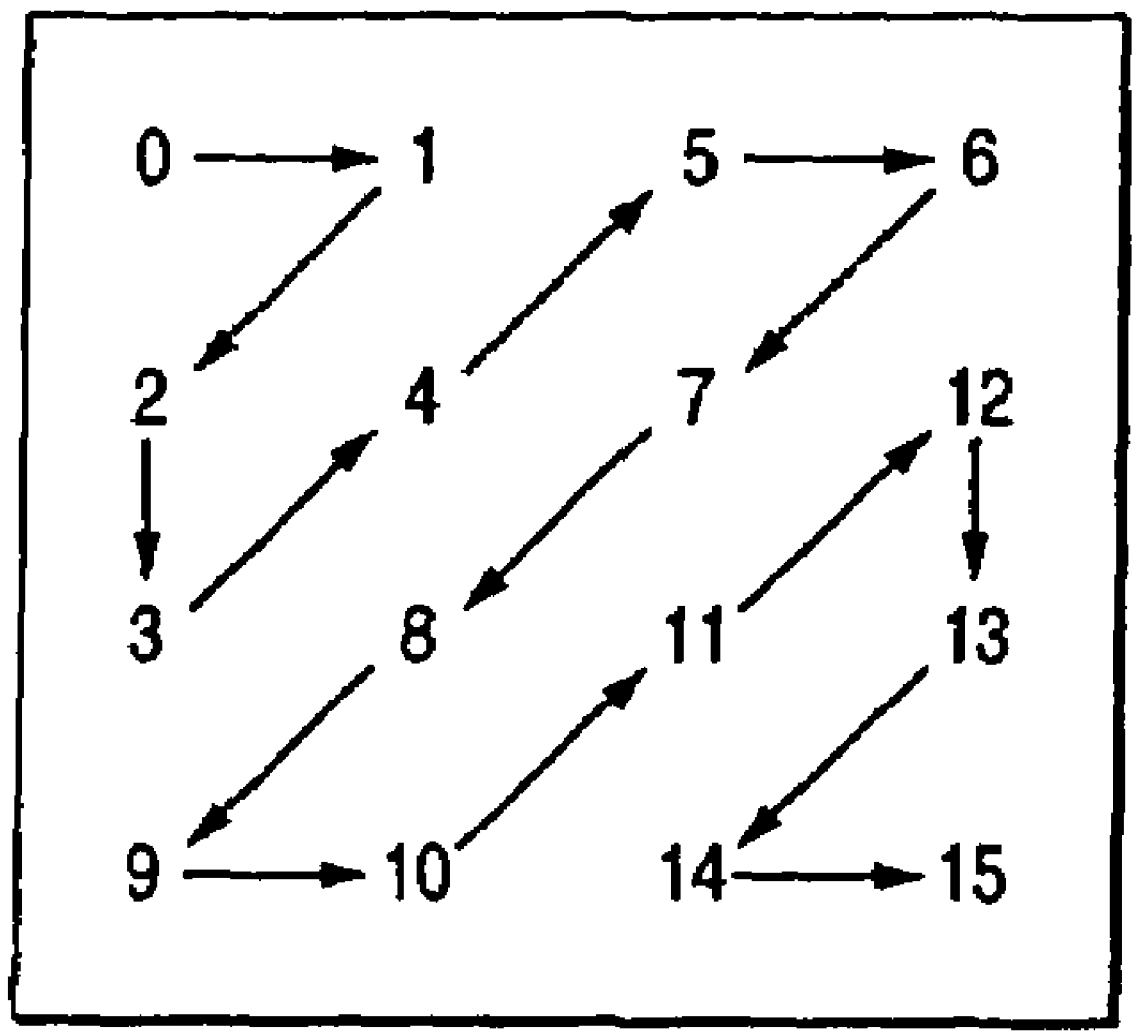
FIG. 3 is a figure showing a 4×4 zigzag scanning scheme in the JVT image compression information.

Under the H.26L standard, when carrying out a quantizing process, 4×4 orthogonal transform coefficients are scanned over in the sequence as shown in FIG. 3. In FIG. 3, "0"-"15" represent orthogonal transform coefficients corresponding to totally sixteen pixel positions located in a 4×4 matrix form.

Figure 4:
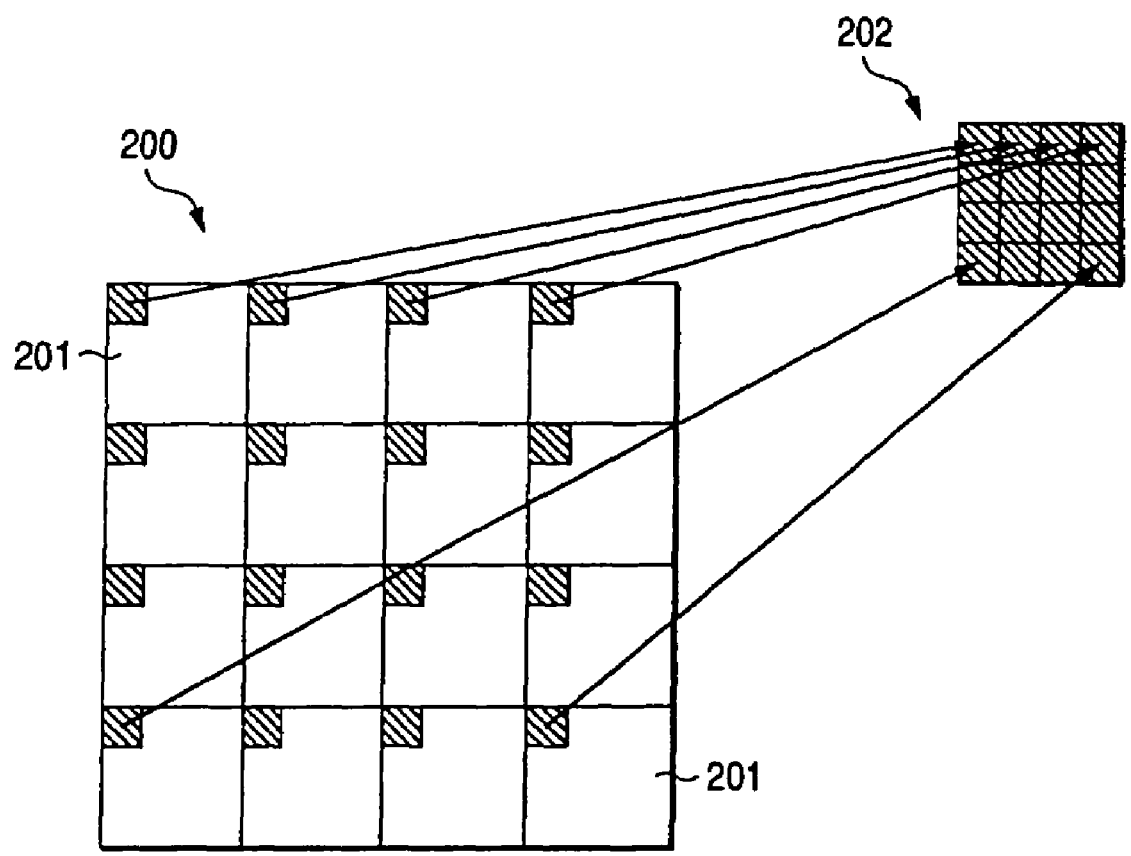
FIG. 4 is a figure showing a coding scheme on the luminance signal component of an intra 16×16 macro-block in the JVT coding scheme.

As shown in FIG. 4, in a 16×16 intra-macro-block 200, orthogonal transform is carried out on each of the sixteen 4×4 orthogonal transform blocks 201 included in the relevant macro-block 200, thereafter collecting only luminance DC coefficients having DC components corresponding to luminance position "0" thereof and again generating a 4×4 block 202. This is subjected to orthogonal transform.

The 4×4 blocks 202 are scanned over in the sequence as explained in FIG. 3.

Meanwhile, the luminance AC coefficients, as AC components shown by the remaining luminances "1"-"15" within the 4×4 orthogonal transform block 201, are scanned zigzag in the sequence of starting at the second position (position at "1") in a manner shown in FIG. 3.

Figure 5:
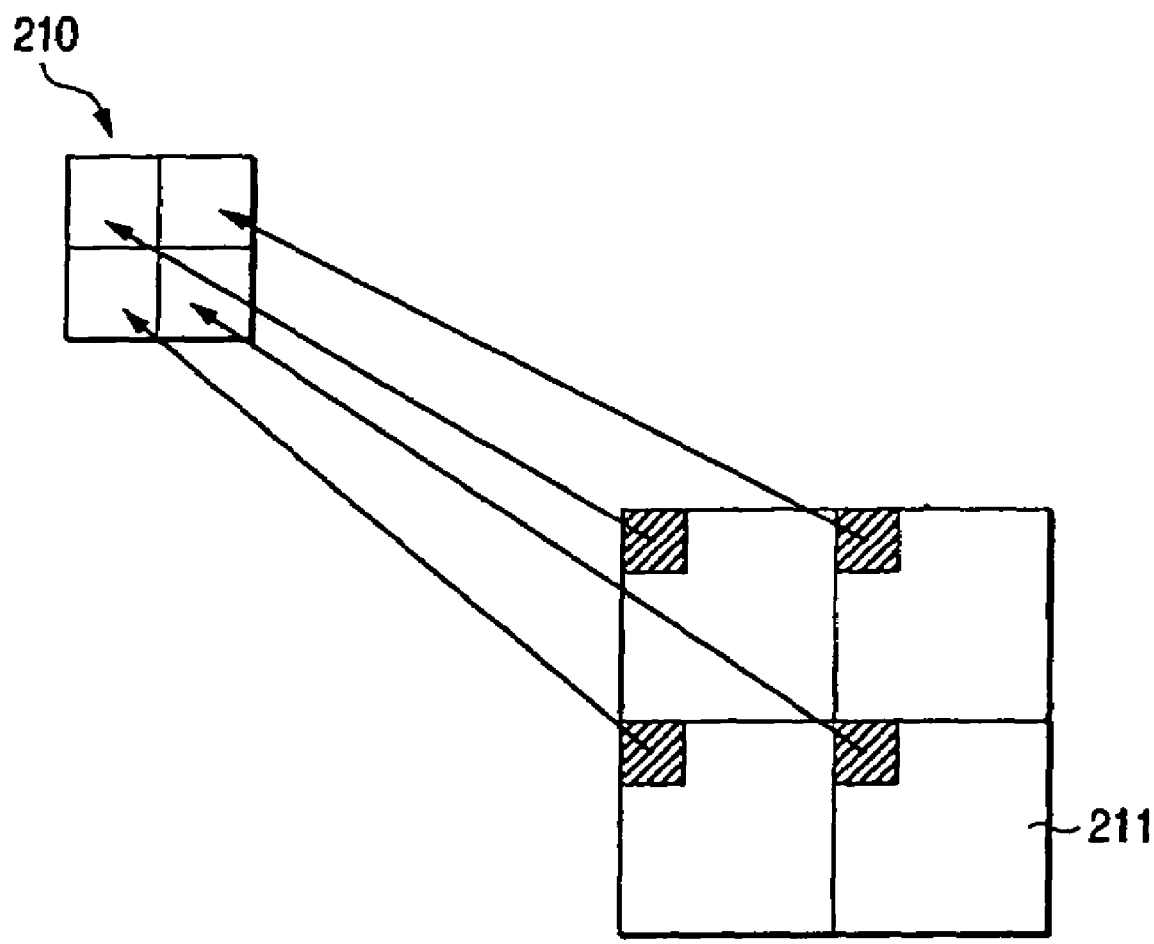
FIG. 5 is a figure showing a coding scheme on the chrominance signal component of an intra 16×16 macro-block in the JVT coding scheme.

Meanwhile, in the inverse quantizing process of the 16×16 intra-macro-block under a chrominance signal component coding scheme, the chrominance DC coefficients within the 2×2 block 210 are first scanned in a raster sequence, as shown in FIG. 5. Then, the chrominance AC coefficients "1"-"15" remaining in the 4×4 chrominance blocks 211 are scanned zigzag in a sequence of starting at the second position (position at "1") shown in FIG. 3.

A QP value, a quantizing parameter, is set by different values of 0-51 in the number of 52.

A $QP_C$ value, for use in chrominance, is defined with correspondence to a luminance $QP_Y$ value as shown in FIG. 6.

The QP value is set to double the quantizing scale each time it increases 6 (Periodic Quantization). Namely, the quantizing scale increases about 12% (becomes 1.12 times greater) as the QP value increases 1.

The coefficient R(m, i, j), to be used in the computation equation mentioned later, is computed by using a pseudo-code shown in the following (1-1).

$$R_{ij}^{(m)} = \begin{cases} V_{m0} & \text{for } (i, j) \in \{(0, 0), (0, 2), (2, 0), (2, 2)\} \\ V_{m1} & \text{for } (i, j) \in \{(1, 1), (1, 3), (3, 1), (3, 3)\} \\ V_{m2} & \text{otherwise} \end{cases} \quad (1\text{-}1)$$

The first and second subscripts on V in the above (1-1) respectively represent the row and column numbers of a matrix shown in the following (1-2).

$$V = \begin{bmatrix} 10 & 16 & 13 \\ 11 & 18 & 14 \\ 13 & 20 & 16 \\ 14 & 23 & 18 \\ 16 & 25 & 20 \\ 18 & 29 & 23 \end{bmatrix} \quad (1\text{-}2)$$

After decoding the quantized DC coefficient of the 4×4 block luminance component coded in the 16×16 intra-mode, an orthogonal transform process is carried out in a procedure mathematically equivalent to the scheme as explained below. An inverse quantizing process is carried out after the orthogonal transform process.

The orthogonal transform process, on the DC coefficient of the 4×4 block luminance component coded in the 16×16 intra-mode, is defined as in the following (1-3).

In the following (1-3), $X_{QD}$ represents a matrix of the luminance DC coefficients after orthogonal transformation. The center matrix on the right-hand represents a matrix of the luminance DC coefficients before orthogonal transformation.

$$X_{QD} = \begin{bmatrix} 1 & 1 & 1 & 1 \\ 1 & 1 & -1 & -1 \\ 1 & -1 & -1 & 1 \\ 1 & -1 & 1 & -1 \end{bmatrix} \begin{bmatrix} y_{QD00} & y_{QD01} & y_{QD02} & y_{QD03} \\ y_{QD10} & y_{QD11} & y_{QD12} & y_{QD13} \\ y_{QD20} & y_{QD21} & y_{QD22} & y_{QD23} \\ y_{QD30} & y_{QD31} & y_{QD32} & y_{QD33} \end{bmatrix} \quad (1\text{-}3)$$

-continued $$\begin{bmatrix} 1 & 1 & 1 & 1 \\ 1 & 1 & -1 & -1 \\ 1 & -1 & -1 & 1 \\ 1 & -1 & 1 & -1 \end{bmatrix}$$

The image compression information conforming to this specification is not allowed to have an $X_{QD}(i, j)$ value exceeding an integer value within a range of $-2^{15}$ to $2^{15}-1$.

After the orthogonal transform process, inverse quantization is carried out in the following procedure.

In the case that QP is a value of 12 or greater, inverse quantization is made on the basis of the following (1-4).

Herein, $DC_{ij}$ represents a DC coefficient inversely quantized while $F_{ij}$ represents a DC coefficient before inverse quantization.

$$DC_{ij}=[F_{ij}\cdot R_{00}^{(QP\%6)}]<<(QP/6-2), i,j=0,\ldots,3 \quad (1\text{-}4)$$

Meanwhile, in the case that QP is a value of 12 or smaller, inverse quantization is processed on the basis of the following (1-5).

$$DC_{ij}=[F_{ij}\cdot R_{00}^{(QP\%6)}+2^{1-QP/6}]>>(2-QP/6), i,j=0,\ldots,3 \quad (1\text{-}5)$$

The bit stream conforming to this specification is not allowed to have a $DC_{ij}$ value exceeding an integer value in the range of $-2^{15}$ to $2^{15}-1$.

After decoding the quantized DC coefficient in the 2×2 block of chrominance component, an orthogonal transform process is carried out in a procedure mathematically equivalent to the following (1-6).

$$X_{QD} = \begin{bmatrix} 1 & 1 \\ 1 & -1 \end{bmatrix} \begin{bmatrix} i_{00} & i_{01} \\ i_{10} & i_{11} \end{bmatrix} \begin{bmatrix} 1 & 1 \\ 1 & -1 \end{bmatrix} \quad (1\text{-}6)$$

The image compression information conforming to this specification is not allowed to have an $X_{QD}(i,j)$ value exceeding an integer value in the range of $-2^{15}$ to $2^{15}-1$.

The inverse quantization after an orthogonal transform process on chrominance components is carried out in the following procedure.

In the case that QP is a value of 6 or the greater, inverse quantization is made on the basis of the following (1-7).

$$DC_{ij}=[F_{ij}\cdot R_{00}^{(QP\%6)}]<<(QP/6-1), i,j=0,\ldots,3 \quad (1\text{-}7)$$

In the case that QP is a value smaller than 6, inverse quantization is made on the basis of the following (1-8).

$$DC_{ij}=[F_{ij}\cdot R_{00}^{(QP\%6)}]>>1, i,j=0,\ldots,3 \quad (1\text{-}8)$$

The bit stream conforming to this specification is not allowed to have a $DC_{ij}$ value exceeding an integer value in the range of $-2^{15}$ to $2^{15}-1$.

The inverse quantizing process on 4×4 coefficients other than the foregoing is carried out on the basis of the following (1-9).

$$W_{ij}=[c_{ij}\cdot R_{ij}^{(QP\%6)}]<<(QP/6), i,j=0,\ldots,3 \quad (1\text{-}9)$$

Herein, R(m, i, j) is a coefficient defined in the foregoing equation (1-1).

The image compression information conforming to this specification is not allowed to have a $W_{ij}$ value exceeding an integer value in the range of $-2^{15}$ to $2^{15}-1$.

After decoding the orthogonal transform coefficient matrix of 4×4 block shown in the following (1-10), an orthogonal transform process transforms the decoded orthogonal transform coefficient block into an output pixel value block in the mathematically equivalent procedure shown below.

$$W = \begin{bmatrix} w_{00} & w_{01} & w_{02} & w_{03} \\ w_{10} & w_{11} & w_{12} & w_{13} \\ w_{20} & w_{21} & w_{22} & w_{23} \\ w_{30} & w_{31} & w_{32} & w_{33} \end{bmatrix} \quad (1\text{-}10)$$

Namely, one-dimensional orthogonal transform process is carried out on the respective rows of decoded orthogonal coefficients.

Then, the similar one-dimensional transform process is made on the determined matrix columns.

Herein, provided that the input orthogonal transform coefficient is $w_0, w_1, w_2, w_3$, an intermediate value $z_0, z_1, z_2, z_3$ is first determined from the following (1-11), and furthermore a pixel value of a decoded image or a difference value thereof $x_0, x_1, x_2, x_3$ is determined by the following (1-12).

$$z_0=w_0+w_2$$

$$z_1=w_0-w_2$$

$$z_2=(w_1>>1)-w_3$$

$$z_3=w_1+(w_3>>1) \quad (1\text{-}11)$$

$$x_0=z_0+z_3$$

$$x_1=z_1+z_3$$

$$x_2=z_1-z_3$$

$$x \times z_0-z_3 \quad (1\text{-}12)$$

The image compression information conforming to this specification is not allowed to have a value $z_0, z_1, z_2, z_3, X_0, x_1, x_2, x_3$ exceeding the integer value within the range of $-2^{15}$ to $2^{15}-1$, in the first (horizontal) and second (vertical) orthogonal transform processes. Meanwhile, the bit stream conforming to this specification is not allowed to have a value $x_0, x_1, x_2, x_3$ exceeding the integer value within the range of $-2^{15}$ to $2^{15}-1$, in the second (vertical) orthogonal transform process.

In both the horizontal and vertical directions, the following (1-13) block obtained by carrying out the orthogonal transform process is used, to compute a pixel value of decoded image or its difference value according to the following (1-14).

$$X' = \begin{bmatrix} x'_{00} & x'_{01} & x'_{02} & x'_{03} \\ x'_{10} & x'_{11} & x'_{12} & x'_{13} \\ x'_{20} & x'_{21} & x'_{22} & x'_{23} \\ x'_{30} & x'_{31} & x'_{32} & x'_{33} \end{bmatrix} \quad (1\text{-}13)$$

$$X''(i, j) = [X'(i, j) + 2^5] \gg 6 \quad (1\text{-}14)$$

The final pixel value is computed by finally adding the decoded predictive residual value $X''(i, j)$ with a motion compensation predictive value or space predictive value $P(i, j)$ as shown in the following (1-15) and making a clipping to include it within a range of 0 to 255.

$$S'_{ij}=\text{Clip1}(P_{ij}+X''_{ij}) \quad (1\text{-}15)$$

In step 3 in a code-amount control scheme defined under TestModel of MPEG2 ("TestModel5", ISO/IEC, JTC/SC29/WG11/N0400, 1993), a method is defined to carry out adaptive quantization on the macro-block basis. Namely, by the method defined below, activity is changed on the macro-block basis, to quantize the reference quantizing scale code at greater coarseness in a complicated pattern region where deterioration is less visually noticeable.

Now, described are steps 1 to 3 in the rate control scheme defined under TestModel of MPEG2.

In step 1, the assigned bit amount to the pictures within a GOP (Group of Pictures) is distributed for the pictures not yet coded including the subject-of-assignment picture, on the basis of the bit amount R of assignment. This distribution is repeated in the order of coding pictures within the GOP. In such a case, the feature lies in making a code amount assignment to the pictures by the use of the following first and second assumptions.

The first assumption is an assumption that the product of a mean quantizing scale code and a generation code amount used for coding each picture is constant on each picture type unless there is a change on the screen.

Consequently, after coding the pictures, the parameter $X_I$, $X_P$, $X_B$ (Global Complexity Measure) representative of screen complexities is updated on each picture type according to the following (2-1).

With this parameter, it is possible to deduce the relationship between a quantizing scale code and generation code amount for coding the next picture.

$$\left.\begin{array}{l} X_I = S_I \cdot Q_I \\ X_P = S_P \cdot Q_P \\ X_B = S_B \cdot Q_B \end{array}\right\} \quad (2\text{-}1)$$

Herein, $S_I$, $S_P$, $S_B$ are generation code bits upon coding the picture while $Q_I$, $Q_P$, $Q_B$ are mean quantizing scale codes in coding the picture.

Meanwhile, the initial value is assumably a value shown by the following (2-2), (2-3), (2-4) with the use of bit_rate [bits/sec] as a target code amount.

$$X_I = 160 \times \text{bit\_rate}/115 \quad (2\text{-}2)$$

$$X_P = 60 \times \text{bit\_rate}/115 \quad (2\text{-}3)$$

$$X_B = 42 \times \text{bit\_rate}/115 \quad (2\text{-}4)$$

The second assumption is to assume that, when the quantizing scale code ratio $K_P$, $K_B$ of P, B picture with reference to the quantizing scale code of I picture takes a value defined in the following (2-5), the entire quality of image is to be optimized at all times.

$$K_P = 1.0; K_B = 1.4 \quad (2\text{-}5)$$

Namely, the quantizing scale code of B picture is always 1.4 times the quantizing scale code of I, P picture. This is based on the assumption that, in case B picture is quantized somewhat coarser as compared to I, P picture to thereby add I, P picture with the code amount saved on B picture, image quality is improved on I, P picture and further on B picture making a reference to that.

By the above two assumptions, the assignment code amount ($T_I$, $T_P$, $T_B$) to the pictures within the GOP is a value as represented by the following (2-6), (2-7), (2-8).

In the following (2-6), picture_rate represents the number of pictures to be displayed per second (in the present sequence).

$$T_I = \max\left\{\frac{R}{1 + \frac{N_P X_P}{X_I X_B} + \frac{N_B K_B}{X_I K_B}}, \frac{\text{bit\_rate}}{8 \times \text{picture\_rate}}\right\} \quad (2\text{-}6)$$

$$T_P = \max\left\{\frac{R}{N_P + \frac{N_B K_P X_B}{K_B X_P}}, \frac{\text{bit\_rate}}{8 \times \text{picture\_rate}}\right\} \quad (2\text{-}7)$$

$$T_B = \max\left\{\frac{R}{N_B + \frac{N_P K_B X_P}{K_P X_B}}, \frac{\text{bit\_rate}}{8 \times \text{picture\_rate}}\right\} \quad (2\text{-}8)$$

Herein, $N_P$, $N_B$ is the number of P, B pictures not yet coded within the GOP.

Namely, concerning those of a picture type different from the picture as a subject of assignment among the uncoded pictures within the GOP, deduction is made as to how many times in amount the generation code of the subject-of-assignment pictures the relevant picture generates codes under the foregoing condition of image-quality optimization.

Then, it is determined to what number of subject-of-assignment pictures the deduced generation code generated by the uncoded picture entirety corresponds.

For example, $N_P X_P / X_I K_P$ in the denominator second term of the first factor in the foregoing (2-6) represents how many sheets of I pictures the $N_P$ sheets of uncoded pictures within the GOP are to be converted. This can be obtained by multiplying $N_P$ by the ratio $S_P/S_I$ of the generation code amount on P picture to the generation amount on I picture, to represent with $X_I$, $X_P$, $K_B$ by using the foregoing (2-1), (2-5).

The bits on the subject-of-assignment picture are obtained by dividing the assignment bits R to the uncoded picture by that number of sheets. However, the lower limit is set to the value in consideration of code amount required for the header or the like in a fixed fashion.

On the basis of the assignment code amount thus determined, each time the picture is coded according to the step 1, 2, the code amount R to be assigned to the uncoded pictures within the GOP is updated according to the following (2-9).

$$R = R - S_{I,P,B} \quad (2\text{-}9)$$

Meanwhile, when coding the first picture of the GOP, R is updated according to the following (2-10).

$$R = \frac{\text{bit\_rate} \times N}{\text{picture\_rate}} - R \quad (2\text{-}10)$$

Herein, N is the number of pictures within the GOP. Meanwhile, the R initial value in the beginning of sequence is assumably rendered 0.

Now, the step 2 is described.

In the step 2, in order to make the assignment bits ($T_I$, $T_P$, $T_B$) to the pictures determined in the step 1 agree with the actual code amount, a quantizing scale code is determined under macro-block-based feedback control on the basis of the capacity of three kinds of virtual buffers independently set up for each picture type.

At first, prior to coding the j-th macro-block, the occupation amount on the virtual buffer is determined according to (2-11), (2-12), (2-13).

$$d_j^I = d_0^I + B_{j-1} - \frac{T_I \times (j-1)}{MBcnt} \quad (2\text{-}11)$$

$$d_j^P = d_0^P + B_{j-1} - \frac{T_P \times (j-1)}{MBcnt} \quad (2\text{-}12)$$

$$d_j^B = d_0^B + B_{j-1} - \frac{T_B \times (j-1)}{MBcnt} \quad (2\text{-}13)$$

$d_o^I, d_o^P, d_o^B$ is the initial occupation amount on each virtual buffer, $B_j$ is the generation bits from a picture head to a J-th macro-block, and MBcnt is the number of macro-blocks within one picture.

The virtual buffer occupation amount ($d_{MBcnt}^I$, $d_{MBcnt}^P$, $d_{MBcnt}^B$) upon each end of picture coding is of the same picture type, which is used as the initial value ($d_o^I, d_o^P, d_o^B$) of a virtual buffer occupation amount for the next picture.

Then, the quantizing scale code $Q_j$ on the j-th macro-block is computed according to the following (2-14).

Herein, $d_j$ is defined as (Equations 2-11 to 2-13) by the use of $d_j^I, d_j^P, d_j^B$.

$$Q_j = \frac{d_j \times 31}{r} \quad (2\text{-}14)$$

r is a parameter, called a reaction parameter, for controlling the response speed over the feedback loop. This is given by the following (2-15).

$$r = 2 \times \frac{bit\_rate}{picture\_rate} \quad (2\text{-}15)$$

Note that the virtual-buffer initial value in the beginning of sequence is given by the following (2-16).

$$d_0^I = 10 \times \frac{r}{31}, \quad d_0^P = K_P d_0^I, \quad d_0^B = K_B d_0^I \quad (2\text{-}16)$$

Now, the step 3 is described.

Activity is provided by using the luminance signal pixel value of the original image instead of predictive errors and by using the pixel values of totally eight blocks of four 8×8 blocks in a frame DCT mode and four 8×8 blocks in a field DCT coding mode, according to the following (2-17), (2-18), (2-19).

The following (2-18) shows var_sblk as a square sum of differences between pixel data on each pixel and its mean value, having a value increased as the image by the 8×8 block becomes complicated.

$$act_j = 1 + \min_{sblk=1,8}(var\_sblk) \quad (2\text{-}17)$$

$$var\_sblk = \frac{1}{64}\sum_{K=1}^{64}(P_k - \overline{P})^2 \quad (2\text{-}18)$$

$$\overline{P} = \frac{1}{64}\sum_{k=1}^{64} P_k \quad (2\text{-}19)$$

Herein, $P_K$ is a pixel value within a luminance signal block of the original image. The reason for taking the minimum value (min) in the above (2-17) is because of making quantization fine where there is a flat region even in a part within the 16×16 macro-block.

Furthermore, a normalization activity $Nact_j$, whose value takes a range of 0.5-2, is determined according to the following (2-20).

$$Nact_j = \frac{2 \times act_j + avg\_act}{act_j + 2 \times avg\_act} \quad (2\text{-}20)$$

which avg_act is the mean value of $act_j$ in a picture coded immediately before.

The quantizing scale code $mquant_j$ taking account of visual characteristics is provided on the basis of a reference quantizing scale code $Q_j$, according to the following (2-21).

$$mquant_j = Q_j \times Nact_j \quad (2\text{-}21)$$

In the meanwhile, the JVT (Joint Video Team) image information coding apparatus may have input image information in an interlaced-scanning format, similarly to the MPEG2 image information coding apparatus. The JVT image coding scheme defines a field/frame adaptive coding scheme in picture level and a field/frame adaptive coding scheme in macro-block level, as described in the following.

Using FIG. 7, explanation is made on the field/frame coding scheme in picture level as defined under the JVT coding scheme.

Namely, it is possible, on each picture, to make a coding by selecting one higher in coding efficiency from frame coding and field coding.

Using FIG. 8, explanation is made on the field/frame coding scheme in macro-block level as defined under the JVT coding scheme.

Figure 8B:
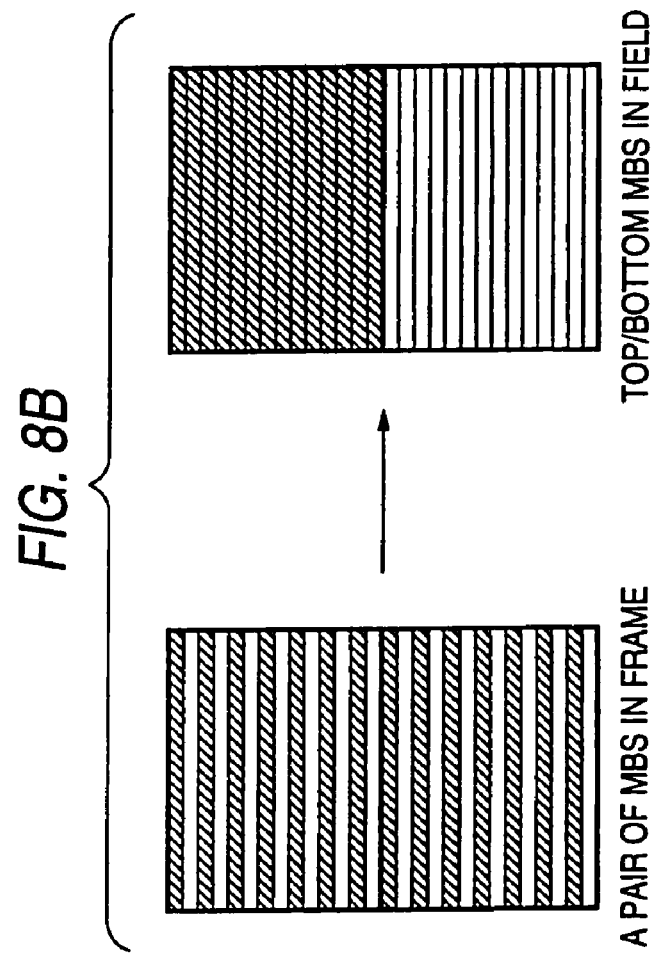
FIGS. 8A, 8B are figures for explaining a field/frame adaptive coding scheme in macro-block level, defined under the JVT coding scheme.
Figure 8A:
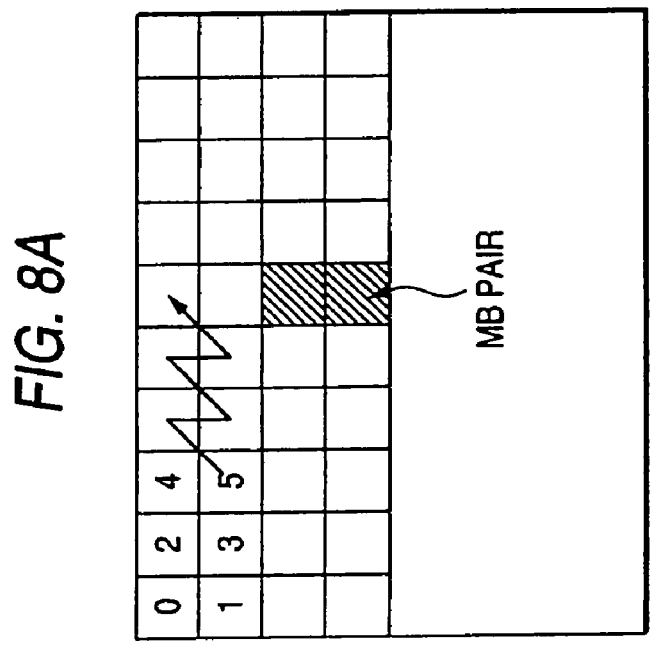

Namely, when implementing field/frame coding in macro-block level under the JVT coding scheme, scanning is made by taking two macro-blocks as a pair as shown in FIG. 8A. For each of the macro-block pairs, it is possible to select whether to carry out field coding or frame coding, as shown in FIG. 8B.

In the meanwhile, the adaptive quantization as defined in the foregoing TestModel5 cannot be directly applied to the H.26L standard coding scheme, because of the following two reasons.

The first reason is because Periodic Quantization is introduced under the H.26L standard that quantization is made at twice coarseness each time quantizing parameter QP increases 6, i.e. quantizing scale increases about 12% (becomes 1.12 times) as QP increases 1.

Meanwhile, the second reason is because orthogonal transform is on an 8×8-block unit basis under the MPEG2 coding scheme whereas orthogonal transform is on a 4×4-block unit basis under the JVT coding scheme.

Now, explanation is made on an image processing apparatus of the present embodiment for solving the foregoing problem, and a method and coding apparatus therefor.

First Embodiment

Figure 9:
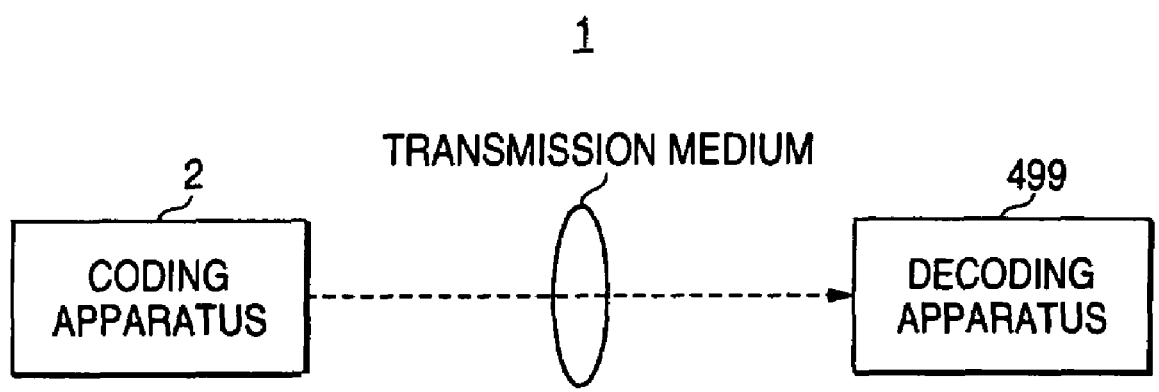
FIG. 9 is a concept figure of a communications system according to a first embodiment of the present invention.

FIG. 9 is a concept diagram of a communications system 1 of the present embodiment.

As shown in FIG. 9, the communications system 1 has a coding apparatus 2 provided at the transmission end and a decoding apparatus 499 provided at the reception end.

The coding apparatus 2 corresponds to the coding apparatus of the invention.

The coding apparatus 2 and the decoding apparatus 499 respectively perform a coding and a decoding, on the basis of the foregoing H.26L.

The decoding circuit 499 is the same as that mentioned before using FIG. 2.

In the communications system 1, the coding apparatus 2 at the transmission end generates compressed frame image data (bit stream) by an orthogonal transform, such as discrete cosine transform or Karhunen-Loeve transform, and motion compensation. The frame image data, after modulated, is transmitted through transmission mediums, such as a satellite broadcast wave, a cable TV network, a telephone line network, a cellular telephone line network, etc.

On the reception side, after demodulating a received image signal, the frame image data decompressed by inverse transform is generated and utilized to the orthogonal transform upon modulation and motion compensation.

Note that the foregoing transmission medium may be a recording medium, such as an optical disk, a magnetic disk, a semiconductor memory, etc.

Incidentally, this embodiment is characterized in the method to compute the change-amount data $\Delta Q$ of quantizing parameter in the coding apparatus 2.

Figure 10:
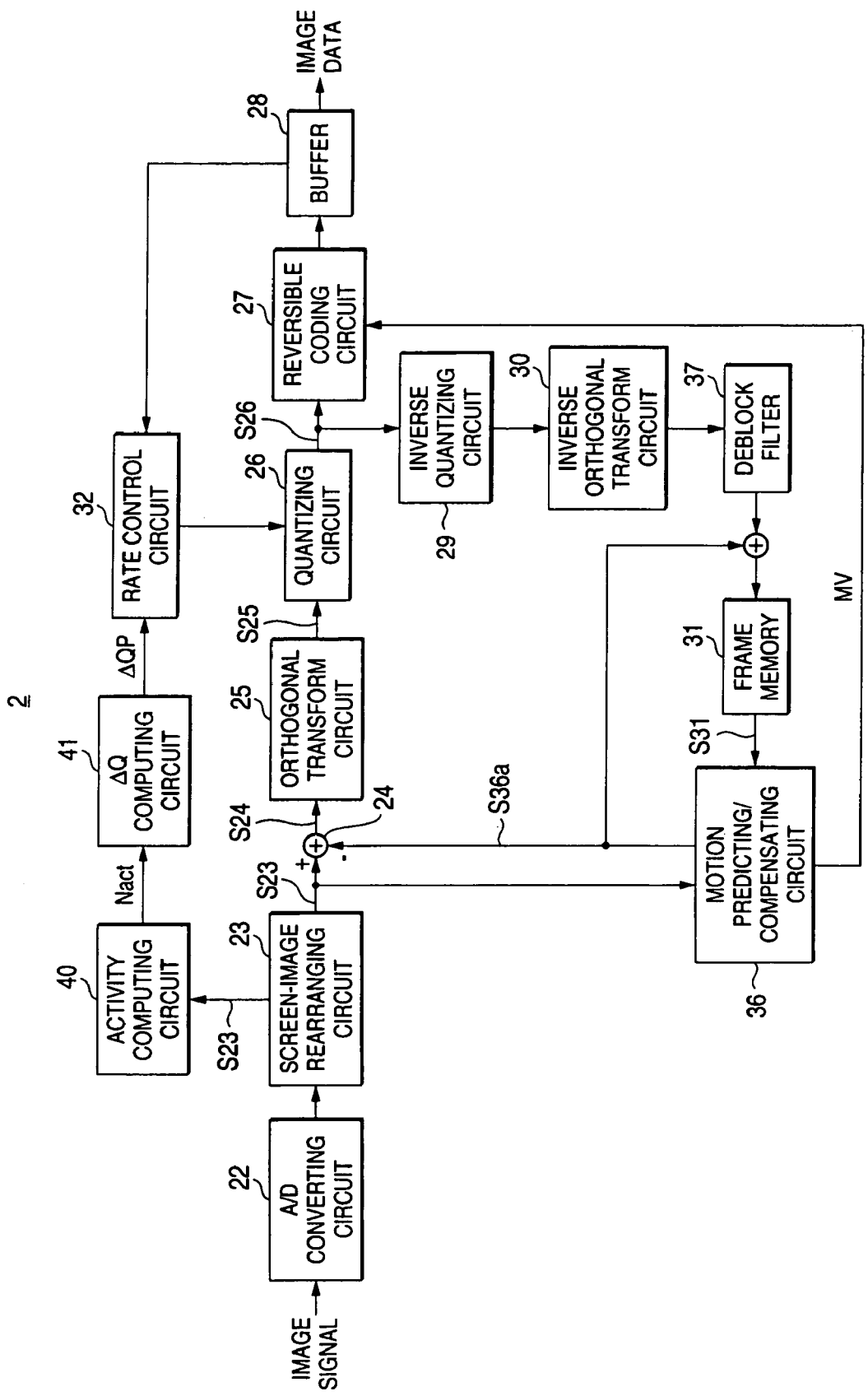
FIG. 10 is a functional block diagram of a coding apparatus according to the first embodiment of the present invention.

FIG. 10 is an overall configuration diagram of the coding apparatus 2 shown in FIG. 9.

As shown in FIG. 10, the coding apparatus 2 has, for example, an A/D converting circuit 22, a screen-image rearranging circuit 23, an operating circuit 24, an orthogonal transform circuit 25, a quantizing circuit 26, a reversible coding circuit 27, a buffer 28, an inverse quantizing circuit 29, an inverse orthogonal transform circuit 30, a frame memory 31, a rate control circuit 32, a motion predicting/compensating circuit 36, a deblock filter 37, an activity computing circuit 40, and a $\Delta Q$ computing circuit 41.

The orthogonal transform circuit 25 corresponds to the orthogonal transform circuit of the invention, the quantizing circuit 26 to the quantizing circuit of this embodiment, the reversible coding circuit 27 to the coding circuit of the invention, the motion predicting/compensating circuit 36 to the motion predicting/compensating circuit of the invention, the activity computing circuit 40 to the index-data generator of the invention, the $\Delta Q$ computing circuit 41 to a change-amount data acquiring device of the invention, and the rate control circuit 32 to a quantizing parameter generator of the invention.

The coding apparatus 2 carries out an orthogonal transform on a 4×4-block unit basis according to the H.26L standard, and makes a quantization on the basis of the foregoing Periodic Quantization.

Now, explanation is made on the constituent elements of the coding apparatus 2.

The A/D converting circuit 22 converts an input analog image signal constituted by a luminance signal Y and a chrominance signal Pb, Pr into a digital image signal, and outputs it to the screen-image rearranging circuit 23.

The screen-image rearranging circuit 23 outputs the frame image data S23 that the frame image signals in the image signal input from the A/D converting circuit 22, after being rearranged in a coding order according to a GOP (Group Of Pictures) structure including its picture type I, P, B, to the operating circuit 24, to the motion predicting/compensating circuit 36 and activity computing circuit 40.

When to inter-code the frame image data S23, the operating circuit 24 generates image data S24 representative of a difference between the frame image data S23 and the predictive frame image data S36a input from the motion predicting/compensating circuit 36, and outputs it to the orthogonal transform circuit 25.

Meanwhile, when to intra-code the frame image data S23, the operating circuit 24 outputs the frame image data S23 as image data S24 to the orthogonal transform circuit 25.

The orthogonal transform circuit 25 carries out an orthogonal transform such as a discrete cosine transform or Karhunen-Loeve transform, on the image data S24, thereby generating image data (e.g. DCT coefficient signal) S25 and outputting it to the quantizing circuit 26.

The orthogonal transform circuit 25 carries out an orthogonal transform on a 4×4-block unit basis, according to the foregoing H.26L standard.

The quantizing circuit 26 quantizes the image data S25 into image data S26 with the use of a quantizing scale input from the rate control circuit 32, and outputs it to the reversible coding circuit 27 and inverse quantizing circuit 29.

The reversible coding circuit 27 stores to the buffer 28 the image data 526 after being variable-length coded or arithmetically coded.

At this time, the reversible coding circuit 27 performs coding on the motion vector MV input from the motion predicting/compensating circuit 36 or the difference thereof, and stores it to header data.

The image data stored in the buffer 28 is sent after being modulated or otherwise processed as needed.

The inverse quantizing circuit 29 generates the data inverse-quantized of the image data S26, and outputs it to the inverse orthogonal transform circuit 30, through deblock filter 37.

The inverse quantizing circuit 29 carries out the inverse quantizing process on the basis of the H.26L standard, according to the foregoing equations (1-4), (1-5), (1-7), (1-8), (1-9).

The inverse orthogonal transform circuit 30 carries out an inverse orthogonal transform and the deblock filter 37 removes block distribution to form frame image data, and stores it to the frame memory 31.

The inverse orthogonal transform circuit 30 carries out an inverse orthogonal transform on a 4×4-block unit basis as mentioned before, in compliance with the H.26L standard.

The rate control circuit 32 generates quantizing parameter QP on the basis of the image data read from the buffer 28 and the change-amount data $\Delta QP$ of quantizing parameter QP input from the $\Delta Q$ computing circuit 41 and controls quantization by the quantizing circuit 26 based on the quantizing scale corresponding to the quantizing parameter.

The rate control circuit 32 uses different values 0-51 as the quantizing parameter QP.

The $QP_c$ value, for use in chrominance, is put with correspondence to the $QP_y$ value of luminance, thus being defined as shown in FIG. 6.

Meanwhile, the rate control circuit 32 determines the quantizing scale such that the quantizing scale is doubled each time the quantizing parameter QP increases 6 (Periodic Quantization). Namely, the quantizing scale is increased about 12% (made 1.12 times) each time the quantizing parameter QP increases 1.

Similarly to the MPEG2 TestModel explained on the basis of foregoing (2-1) to (2-14), the rate control circuit 32 uses the code amount ($T_I$, $T_P$, $T_B$ in the foregoing (2-11), (2-12), (2-13)) assigned to the image data as a subject of coding (picture) or the like, to generate a quantizing scale code $Q_j$ on the basis of the foregoing (2-14) and take it as reference data $OP_{ref}$ (reference data of the invention).

In this case, the rate control circuit 32 acquires $B_{j-1}$ by the foregoing (2-1), (2-12), (2-13), on the basis of the image data from the buffer 28.

Then, the rate control circuit 32 adds the reference data $QP_{ref}$ and the change-amount data $\Delta QP$ together on the basis of the following (3-1), to thereby generate a quantizing parameter QP.

$$QP = QP_{ref} + \Delta QP \qquad (3-1)$$

The motion predicting/compensating circuit 36 carries out a motion predicting/compensating process on the basis of the image data S31 from the frame memory 31 and the image data from the screen-image rearranging circuit 23, to generate a motion vector MV and reference image data S36a.

The motion predicting/compensating circuit 36 outputs the motion vector MV to the reversible coding circuit 27 and the reference data S36a to the operating circuit 24.

The activity computing circuit 40, when the image data S23 (original image picture) is a progressive scanning image, uses its luminance signal pixel value, to compute var_sblk (distributed data of the invention) on each of the four 8×8 blocks (second block of the invention) within the 16×16 macro-block (first block of the invention), on the basis of the following (3-2), (3-3).

Herein, var_sblk is a square sum of differences between pixel data on each pixel and its mean value, having a greater value as the 8×8 block image becomes more complicated.

$$\text{var\_sblk} = \frac{1}{64} \sum_{k=1}^{64} (P_k - \overline{P})^2 \qquad (3-2)$$

$$\overline{P} = \frac{1}{64} \sum_{k=1}^{64} P_k \qquad (3-3)$$

Then, the activity computing circuit 40 obtains $act_j$ by the use of a minimum value (min (var_sblk)) of var_sblk computed on the four 8×8 blocks on the basis of the following (3-4).

$$act_j = 1 + \min_{sblk=1,4} (\text{var\_sblk}) \qquad (3-4)$$

The activity computing circuit 40 computes an activity $Nact_j$ (index data of the invention) on the basis of the following (3-5).

The avg_act in the following (3-5) is a mean value of $act_j$ in the pictures coded immediately before.

Herein, the activity $Nact_j$ is normalized to a value falling within a range of 0.5-2.

$$Nact_j = \frac{2 \times act_j + \text{avg\_act}}{act_j + 2 \times \text{avg\_act}} \qquad (3-5)$$

Incidentally, there is a proposal to implement a macro-block-based field/frame adaptive coding process also under H.26L similarly to that being implemented under MPEG2, in the document "MB adaptive field/frame coding for interlace sequences" (Wang et al, JVT-D108, Joint Video Team (JVT) of ISO/IEC MPEG & ITU-T VCEG, ISO/IEC JCT1/SC29/WG11 and ITU-T SG16 Q.6, Klagenfurt, Austria, July, 2002). However, in the case of making a coding process on this scheme, process is on each 8×8 block as a unit to compute an activity.

The $\Delta Q$ computing circuit 41 uses the activity $Nact_j$ input from the activity computing circuit 40 to carry out, for example, an operation shown in the following (3-6) and generate change-amount data $\Delta QP$ of quantization parameter QP.

$$\Delta QP = \lfloor \log_{1.12} Nact_j \rfloor \qquad (3-6)$$

Namely, the $\Delta Q$ computing circuit 41 defines the relationship of activity $Nact_j$ and change-amount data $\Delta QP$ such that the change-amount data $\Delta QP$ increases 1 (predetermined unit amount of the invention) as activity $Nact_j$ becomes 1.12 times (r times in the invention).

This can provide a definition that, in case the activity $Nact_j$ representative of a complexity of the image as a subject of quantization is doubled, the quantizing parameter QP increases 6 correspondingly to thereby double the quantizing scale.

Namely, it is possible to realize the Periodic Quantization as defined under H.26L that the quantizing scale is increased about 12% (increased to 1.12 times) each time the quantizing parameter QP increases 1.

Incidentally, the $\Delta Q$ computing circuit 41, when the activity $Nact_j$ lies between the minimum and maximum values shown in FIG. 11, may output change-amount data $\Delta QP$ at a value corresponding to that on the basis of the table data 80 shown in FIG. 11, for example.

Now, explanation is made on the overall operation of the coding apparatus 2 shown in FIG. 10.

The input image signal, in the A/D converting circuit 22, is first converted into a digital signal. Then, the screen-image rearranging circuit 23 makes a rearrangement of frame image data, depending upon a GOP structure of the image compression information to be output.

Then, the activity computing circuit 40 generates an activity $Nact_j$ and outputs it to the $\Delta Q$ computing circuit 41.

Then, the $\Delta Q$ computing circuit 41 generates change-amount data $\Delta QP$ on the basis of the activity $Nact_j$ such that the change amount data $\Delta QP$ increases 1 as the activity $Nact_j$ becomes 1.12 times, and outputs it to the rate control circuit 32.

The rate control circuit 32 adds the reference data $QP_{ref}$ and the change amount data $\Delta QP$ together, to generate a quantizing parameter QP.

Meanwhile, concerning the frame image data to be intra-coded, the image information in the frame image data entirety is input to the orthogonal transform circuit 25. In the orthogonal transform circuit 25, an orthogonal transform, such as a discrete cosine transform or a Karhunen-Loeve transform, is carried out.

The orthogonal transform circuit 25 outputs a transform coefficient to be quantized in the quantizing circuit 26.

The quantizing circuit 26 makes a quantization by the quantizing scale defined based on the quantizing parameter QP under the control by the rate control circuit 32.

The quantized transform coefficient, output from the quantizing circuit 26, is input to the reversible coding circuit 27 where it is subjected to reversible coding, such as variable-length coding or arithmetic coding. Thereafter, it is stored to the buffer 28 and then output as compressed image data.

At the same time, the quantized transform coefficient output from the quantizing circuit 26 is input to the inverse quantizing circuit 29, and is further subjected to an inverse orthogonal transform process in the inverse orthogonal transform circuit 30 to generate decoded frame image data. The frame image data is stored in the frame memory 31.

Meanwhile, concerning the image to be inter-coded, the frame image data S23 is input to the motion predicting/compensating circuit 36. Meanwhile, the frame image data S31 of reference image is read from the frame memory 31 and output to the motion predicting/compensating circuit 36.

In the motion predicting/compensating circuit 36, a motion vector MV and predictive frame image data S36a are generated by the use of the reference-image frame image data S31.

Then, in the operating circuit 24, image data S24 is generated as a difference signal between the frame image data from the screen-image rearranging circuit 23 and the predictive frame image data S36a from the motion predicting/compensating circuit 36. The image data S24 is output to the orthogonal transform circuit 25.

Then, in the reversible coding circuit 27, the motion vector MV is processed by a reversible coding, such as variable length coding or arithmetic coding, and inserted to the header of the image data. The other processes are similar to the processes on the image data to be intra-processed.

As explained above, according to the coding apparatus 2, the ΔQ computing circuit 41 defines the relationship between activity $Nact_j$ and change-amount data ΔQP such that, in case the activity $Nact_j$ becomes 1.12 times (r times in the invention), the change-amount data ΔQP increases 1 (predetermined unit amount of the invention), on the basis of the foregoing (3-6) or the table data shown in FIG. 11. This can properly reflect the value of activity $Nact_j$ and realize the Periodic Quantization defined under H.26L.

Meanwhile, according to the coding apparatus 2, although orthogonal transform is on the 4×4 block unit basis, the activity computing circuit 40 computes an activity $Nact_j$ on the basis of the minimum value of var_sblk computed on the four 8×8 blocks within the macro-block. Consequently, the effect of adaptive quantization can be enhanced on the basis of the activity $Nact_j$ appropriately representative of a complexity distribution over the screen entirety.

Second Embodiment

This embodiment is similar to the first embodiment except in that the activity computing circuit 40 uses the 16×16 block as a computation unit for $act_j$.

In this embodiment, the activity computing circuit 40 computes $act_j$ on the basis of the following (3-7), (3-8), (3-9).

$$act_j = 1 + \text{var\_sblk} \tag{3-7}$$

$$\text{var\_sblk} = \frac{1}{256}\sum_{k=1}^{256}(P_k - \overline{P})^2 \tag{3-8}$$

$$\overline{P} = \frac{1}{256}\sum_{k=1}^{256}P_k \tag{3-9}$$

In the case that one mask block is comparatively small in size as compared to the image frame as in HDTV (High Definition Television), favorable image quality based on visual characteristics is available by carrying out such adaptive quantization.

Incidentally, the 16×8 block or 8×16 block may be taken as a computation unit for $act_j$. Adaptive switching may be made between these depending upon image local property.

Figure 12:
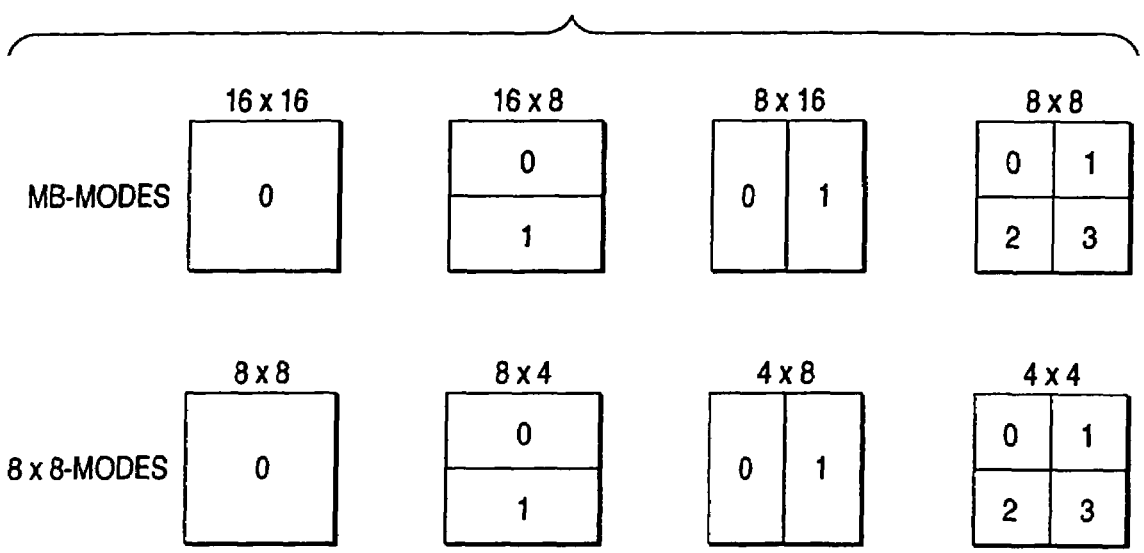
FIG. 12 is a figure showing a variable-sized motion predicting/compensating block defined under the JVT coding scheme.

In the meanwhile, it is possible to use a variable sized motion predicting/compensating block under the H.26L standard, as shown in FIG. 12.

In the inter-macro block, it can be considered that the motion predicting/compensating block in the macro-block is used as a unit to compute an activity.

In the case that the motion predicting/compensating block is in a sub-partition mode, i.e. 8×8 or smaller, there is a possibility that it is impossible to sufficiently obtain an activity dispersion over the entire screen as per the foregoing. Consequently, 8×8 blocks may be taken as an activity computation unit.

Third Embodiment

Although the foregoing first embodiment exemplified the case that the input image data is of progressive scanning image data, the input image data in this embodiment is of an interlaced scanning image (interlace image). As mentioned before by using FIGS. 7 and 8, explanation is made on the case to carry out a field/frame adaptive coding in a picture or micro-block level.

In the case of implementing a field/frame adaptive coding in a picture level as shown in FIG. 7 for example, when the relevant frame is field-coded, the first and second fields are respectively considered frames to thereby carry out an adaptive quantizing process similarly to the case the input image data is progressive H scanned (the first embodiment case), i.e. the processing by the activity computing circuit 40, ΔQ computing circuit 41, rate control circuit 32, and quantizing circuit 26 explained in the first embodiment.

Meanwhile, in the case of implementing a field/frame adaptive coding in a macro-block level as shown in FIG. 8, the activity computing circuit 40 computes $act_j$ on one macro-block pair as explained in FIG. 8A.

Namely, taking into account the cases of field-coding the macro-block pair and frame-coding the same, in the case of taking the 8×8 block as a unit to compute slbk, the $act_j$ of the relevant macro-block pair is computed on totally 8 blocks due to frame-coding and 8 blocks to be field-coded, i.e. totally 16 blocks, on the basis of the following (3-10).

$$act_j = 1 + \min_{sblk=1,16}(\text{var\_sblk}) \tag{3-10}$$

Meanwhile, in a case to take the 16×16 block as a computation unit for $act_j$, the $act_j$ of the relevant macro-block pair is computed on totally 2 blocks due to frame-coding and 2 blocks to be field-coded, i.e. totally 4 blocks, on the basis of the following (3-11).

$$act_j = 1 + \min_{sblk=1,4}(\text{var\_sblk}) \tag{3-11}$$

Although the present invention was outlined on the example applied to H.26L, the invention is not limited in application scope to this, i.e. the present invention is applicable to an arbitrary image coding scheme using Periodic Quantization, 4×4 DCT.

Meanwhile, although the above embodiment exemplified the case that the unit amount of the invention is 1 and r is 1.12, the unit amount and r may be other values.

According to the present invention, it is possible to provide an image processing apparatus capable of properly reflecting image data complexity and defining a change amount of quantizing parameter, and a method therefor and a coding apparatus when image data of motion picture is made r times in quantization coarseness upon increasing a quantizing parameter a predetermined unit amount.

Obviously, numerous modifications and variations of the present invention are possible in light of the above teachings. It is therefore to be understood that within the scope of the appended claims, the present invention may be practiced otherwise than as specifically described herein.

The invention claimed is:

1. An image processing apparatus configured to generate, when image data of motion picture is made r times in quantization coarseness upon increasing a quantizing parameter by a predetermined unit amount, change amount data representative of the change amount of the quantizing parameter, the image processing apparatus comprising:
   index data generating means for generating index data serving as an index of complexity of the image data;
   change amount data acquiring means for defining a corresponding relationship between the index data and the change amount data such that, when the index data becomes r times, the change amount data is increased by the predetermined unit amount, and for acquiring the change amount data corresponding to the index data generated by the index data generating means; and
   quantizing parameter generating means for generating the quantizing parameter based on reference data defined based on a code amount assigned to the image data as a subject of coding and of the change amount data representative of the change amount of the quantizing parameter acquired by the change amount data acquiring means.

2. An image processing apparatus according to claim 1, wherein the index data generating means computes, based on a plurality of second blocks as a unit defined within a first block of the image data, dispersion data representative of a dispersion of pixel data within the plurality of second blocks, and generate the index data by using a minimal one of the dispersion data among the dispersion data computed on the plurality of second blocks.

3. An image processing apparatus according to claim 2, wherein the index data generating means computes the dispersion data by cumulating values depending upon a difference between pixel data within the plurality of second blocks and a mean value of all pixel data within the plurality of second blocks.

4. An image processing apparatus according to claim 2, wherein the index data generating means computes the dispersion data based on the plurality of second blocks as a unit greater in size than a block serving as a unit of making an orthogonal transform on the image data.

5. An image processing apparatus according to claim 2, wherein the index data generating means computes the dispersion data on the plurality of second blocks defined within the first block when the image data is interlaced scanning image data.

6. An image processing apparatus according to claim 2, wherein the index data generating means computes the dispersion data on the plurality of second blocks including a second block corresponding to field coding and a second block corresponding to frame coding.

7. An image processing apparatus according to claim 1, wherein, when the image data is structured by a first field and a second field, the index data generating means generates the index data respectively on the first field and the second field, the change amount data acquiring means acquiring the change amount data on the respective first and second fields based on the index data generated by the index data generating means.

8. A coding apparatus comprising:
   index data generating means for generating index data serving as an index of complexity of image data;
   change amount data acquiring means for defining a corresponding relationship between the index data and change amount data representative of a change amount of a quantizing parameter such that, when the index data becomes r times, the change amount data is increased by a predetermined unit amount, and for acquiring the change amount data corresponding to the index data generated by the index data generating means;
   quantizing parameter generating means for generating the quantizing parameter based on reference data defined based on a code amount assigned to the image data as a subject of coding and of the change amount data representative of the change amount of the quantizing parameter acquired by the change amount data acquiring means;
   an orthogonal transform circuit configured to orthogonally transform image data;
   a quantizing circuit configured to quantize image data orthogonally transformed by the orthogonal transform circuit;
   a quantizing control circuit configured to control quantization by the quantizing circuit such that quantization coarseness is made r times as the quantizing parameter is increased by the predetermined unit amount, based on the quantizing parameter generated by the quantizing parameter generating means;
   a motion predicting/compensating circuit configured to generate reference image data and a motion vector, based on image data quantized by the quantizing circuit; and
   a coding circuit configured to code image data quantized by the quantizing circuit.

9. An image processing apparatus configured to generate, when image data of motion picture is made r times in quantization coarseness upon increasing a quantizing parameter by a predetermined unit amount, change amount data representative of the change amount of the quantizing parameter, the image processing apparatus comprising:
   an activity computing circuit configured to generate index data serving as an index of complexity of the image data;
   a change amount computing circuit configured to define a corresponding relationship between the index data and the change amount data such that, when the index data becomes r times, the change amount data is increased by the predetermined unit amount, and to acquire the change amount data corresponding to the index data generated by the activity computing circuit; and
   a quantizing parameter generator configured to generate the quantizing parameter based on reference data defined based on a code amount assigned to the image data as a subject of coding and of the change amount data representative of the change amount of the quantizing parameter acquired by the change amount computing circuit.

10. An image processing apparatus according to claim 9, wherein the activity computing circuit is configured to compute, based on a plurality of second blocks as a unit defined within a first block of the image data, dispersion data representative of a dispersion of pixel data within the plurality of second blocks, and generate the index data by using a minimal one of the dispersion data among the dispersion data computed on the plurality of second blocks.

11. An image processing apparatus according to claim 10, wherein the activity computing circuit is configured to compute the dispersion data by cumulating values depending upon a difference between pixel data within the plurality of second blocks and a mean value of all pixel data within the plurality of second blocks.

12. An image processing apparatus according to claim 10, wherein the activity computing circuit is configured to compute the dispersion data based on the plurality of second blocks as a unit greater in size than a block serving as a unit of making an orthogonal transform on the image data.

13. An image processing apparatus according to claim 10, wherein the activity computing circuit is configured to compute the dispersion data on the plurality of second blocks defined within the first block when the image data is interlaced scanning image data.

14. An image processing apparatus according to claim 10, wherein the activity computing circuit is configured to compute the dispersion data on the plurality of second blocks including a second block corresponding to field coding and a second block corresponding to frame coding.

15. An image processing apparatus according to claim 9, wherein, when the image data is structured by a first field and a second field, the activity computing circuit is configured to generate the index data respectively on the first field and the second field, the change amount computing circuit is configured to acquire the change amount data on the respective first and second fields based on the index data generated by the activity computing circuit.

16. A coding apparatus comprising:
an activity computing circuit configured to generate index data serving as an index of complexity of image data;
a change amount computing circuit configured to define a corresponding relationship between the index data and change amount data representative of a change amount of a quantizing parameter such that, when the index data becomes r times, the change amount data is increased by a predetermined unit amount, and to acquire the change amount data corresponding to the index data generated by the activity computing circuit;
a quantizing parameter generator configured to generate the quantizing parameter based on reference data defined based on a code amount assigned to the image data as a subject of coding and of the change amount data representative of the change amount of the quantizing parameter acquired by the change amount computing circuit;
an orthogonal transform circuit configured to orthogonally transform image data;
a quantizing circuit configured to quantize image data orthogonally transformed by the orthogonal transform circuit;
a quantizing control circuit configured to control quantization by the quantizing circuit such that quantization coarseness is made r times as the quantizing parameter is increased by the predetermined unit amount, based on the quantizing parameter generated by the quantizing parameter generator;
a motion predicting/compensating circuit configured to generate reference image data and a motion vector, based on image data quantized by the quantizing circuit; and
a coding circuit configured to code image data quantized by the quantizing circuit.

17. An image processing method for generating, when image data of motion picture is made r times in quantization coarseness upon increasing a quantizing parameter a predetermined unit amount, change amount data representative of the change amount of the quantizing parameter, the image processing method comprising:
a first process of generating index data serving as an index of complexity of the image data;
a second process of defining a corresponding relationship between the index data and the change amount data such that, when the index data becomes r times, the change amount data is increased by the predetermined unit amount, and of acquiring the change amount data corresponding to the index data generated in the first process; and
a third process of generating the quantizing parameter based on reference data defined based on a code amount assigned to the image data as a subject of coding and of the change amount data representative of the change amount of the quantizing parameter acquired in the second process.

* * * * *